United States Patent [19]
Kurby

[11] Patent Number: 5,999,125
[45] Date of Patent: *Dec. 7, 1999

[54] METHOD AND APPARATUS FOR A GLOBAL POSITIONING DATA SERVICE

[75] Inventor: Christopher Neil Kurby, Elmhurst, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/690,097

[22] Filed: Jul. 31, 1996

[51] Int. Cl.⁶ ........................................ G01S 5/02
[52] U.S. Cl. ................................ 342/357.1; 342/357.02
[58] Field of Search ........................ 342/352, 357, 342/357.03, 357.09, 357.1, 357.16, 357.02; 455/12.1, 13.1, 456; 701/213

[56] References Cited

U.S. PATENT DOCUMENTS

| | | | |
|---|---|---|---|
| 4,445,118 | 4/1984 | Taylor et al. | 342/357 |
| 5,119,504 | 6/1992 | Durboraw, III | 455/54.1 |
| 5,175,557 | 12/1992 | King et al. | 342/357 |
| 5,365,450 | 11/1994 | Schuchman et al. | 364/449 |
| 5,365,451 | 11/1994 | Wang et al. | 364/449 |
| 5,414,432 | 5/1995 | Penny, Jr. et al. | 342/357 |
| 5,418,538 | 5/1995 | Lau | 342/357 |
| 5,617,100 | 4/1997 | Akiyoshi et al. | 342/357 |
| 5,617,101 | 4/1997 | Maine et al. | 342/358 |
| 5,663,734 | 9/1997 | Krasner | 342/357 |
| 5,685,245 | 11/1997 | Noreen et al. | 340/825.45 |

*Primary Examiner*—Gregory C. Issing
*Attorney, Agent, or Firm*—Sherry J. Whitney

[57] ABSTRACT

In a telecommunication system (15) with at least one gateway (1), subscriber units (2), system controller (3), at least one communication satellite (4) and global positioning satellites (5), gateway (1) provides a global positioning data service to subscriber units (2). Gateway (1) receives ephemeris and almanac data on link (7) from global positioning satellites (5). Requests for portions of the data are received via link (11) and these portions are transmitted on link (10). Subscriber unit (2) receives on link (6) positioning information which is used by subscriber unit controller (33) to self-determine accurate location data. Subscriber unit (2) transmits a global positioning data service request via link (8) and receives the requested global positioning data service data via link (9).

14 Claims, 4 Drawing Sheets

METHOD AND APPARATUS FOR A GLOBAL POSITIONING DATA SERVICE

CROSS-REFERENCE TO RELATED APPLICATIONS

The present invention is related to the following patents or patent applications, all of which are assigned to the same assignee as the present invention:

U.S. Pat. No. 5,119,504, "Position Aided Subscriber Unit For A Satellite Cellular System", Isaac N. Durboraw, III;

U.S. Pat. No. 5,365,451, "Mobile Unit Tracking System", Theresa C. Y. Wang et al.;

U.S. Pat. No. 5,414,432, "Position Locating Transceiver", Robert E. Penny Jr. et al.; and U.S. patent application No. 690,137, "Method and Apparatus For An Acquisition-Aided Geo-Locating Subscriber Unit ", filed concurrently with the present application.

FIELD OF THE INVENTION

The present invention pertains to portable telecommunication devices and more particularly to portable telecommunication devices which perform a self-determined location process.

BACKGROUND OF THE INVENTION

When achieving communication between communication satellites and world-wide users of a global telecommunication system, accurate knowledge of a location of each user and each satellite is important to establishing and maintaining a communication link. A subscriber unit which combines voice/data communication and accurate, location self-determination has several advantages as described in prior art. Applications of such a subscriber unit in a system include asset management as described in the prior art. Prior art patents also describe applications such as the coordination of activities of search and rescue and various military operations.

Since communications between a subscriber unit and a group of satellites can involve frequent hand-offs between cells created by the individual satellites and between adjacent satellites, knowledge of accurate location data for both the subscriber unit and the satellites can be used to efficiently determine an appropriate hand-off strategy. Accurate location data for a subscriber unit also aids in the acquisition process by permitting precise correction for Doppler and reference frequency induced errors. In addition, accurate subscriber unit location data allows a telecommunication system operating in a global market to conform to diverse rules and procedures which could be imposed by diverse political entities within whose jurisdiction a telecommunication system could operate.

The more accurate the location data, the better. More accurate data allow a telecommunication system to better ascertain when subscriber units cross from one jurisdiction into another. However, costs generally increase in proportion to the accuracy of the location data, and an intense need to keep the costs as low as possible and the revenues as high as possible exists. One cost which is of particular concern is the amount of communication resources which are consumed in maintaining current location data. As more resources are consumed in maintaining current location data, fewer resources are available for use by communication service subscribers and for generating revenues.

A GPS (Global Positioning System) receiver can achieve great accuracy in self-determining location if it has current ephemeris data and almanac data and has not moved beyond 500 to 1000 km from it's last location. Generally, a GPS receiver is required to receive the latest ephemeris data from the satellite and so the time to first location fix is dominated by the time taken by the GPS receiver to receive the data. A GPS location acquisition process, in general, includes the following steps:

1) Prediction of GPS satellite visibility/Doppler at the current time;

2) Sequential detection of those satellites thought to be visible. The detection process switches to a sky search on all the satellites if no acquisition is achieved;

3) Acquisition process hands off to track process;

4) Track process includes acquiring message synchronization, and collecting time from a GPS broadcast message;

5) Track process also includes collecting ephemeris data; and

6) Track process continues with the collection of almanac data.

When GPS receivers are turned on from a warm start, a receiver must find appropriate satellites and then collect current ephemeris from the GPS satellites. This data could be transmitted at 50 bits per second, for example, and could take 30 seconds to collect from each of the satellites that are tracked.

If a GPS receiver is doing a cold start or a GPS receiver has moved a great distance around the earth, then the receiver must find the satellites in view without any apriori knowledge. This complete search can take minutes. After satellites are acquired, the receiver then must collect a complete almanac from the GPS satellite, which includes information on the current satellites' orbits and health.

Also, if exact location is not required, then a GPS receiver does not need ephemeris data, and almanac data by itself can be used to estimate satellite parameters. This results in a loss of accuracy depending on the age of the almanac. A benefit of using almanac data only is that the ephemeris collections can be bypassed and the access time is shortened. However, provisions to update the almanac data must be provided eventually. A GPS receiver takes about 12.5 minutes to accomplish this task and requires a continuous track on at least one GPS satellite. Bit errors and blockages can cause GPS receivers to use multiple 12.5 minute intervals and this can lead to excessive battery drain. Subscriber units are often battery operated, and an excessive battery drain is not acceptable.

Accordingly, there is a significant need for a global positioning data service method and apparatus that decreases the time that a subscriber unit located anywhere proximate to the surface of the earth takes to self-determine accurate location data using information supplied by a global communication system.

BRIEF DESCRIPTION OF THE DRAWINGS

A more complete understanding of the present invention can be derived by referring to the detailed description and claims when considered in connection with the FIGS., wherein like reference numbers refer to similar items throughout the FIGS., and:

DETAILED DESCRIPTION OF PREFERRED EMBODIMENTS

The present invention describes a subscriber unit and global communication system that have been adapted to work with each other to achieve an improved method for subscriber unit self-determination of accurate location data.

One advantage of the present invention is that a subscriber unit does not have to consume battery power to track a satellite in a global positioning system to obtain almanac data.

A second advantage of the present invention is that a subscriber unit does not need to store any global positioning satellite information which minimizes the amount of memory space required in the unit.

Another advantage is that call-processing will be easier and faster because a global communication system has accurate location data for a subscriber unit in a shorter amount of time.

Also, the accounting process will be easier and more precise because accurate subscriber unit location data is made available quickly. The prior art GPS receivers and position location systems do not provide these features.

Figure 1:
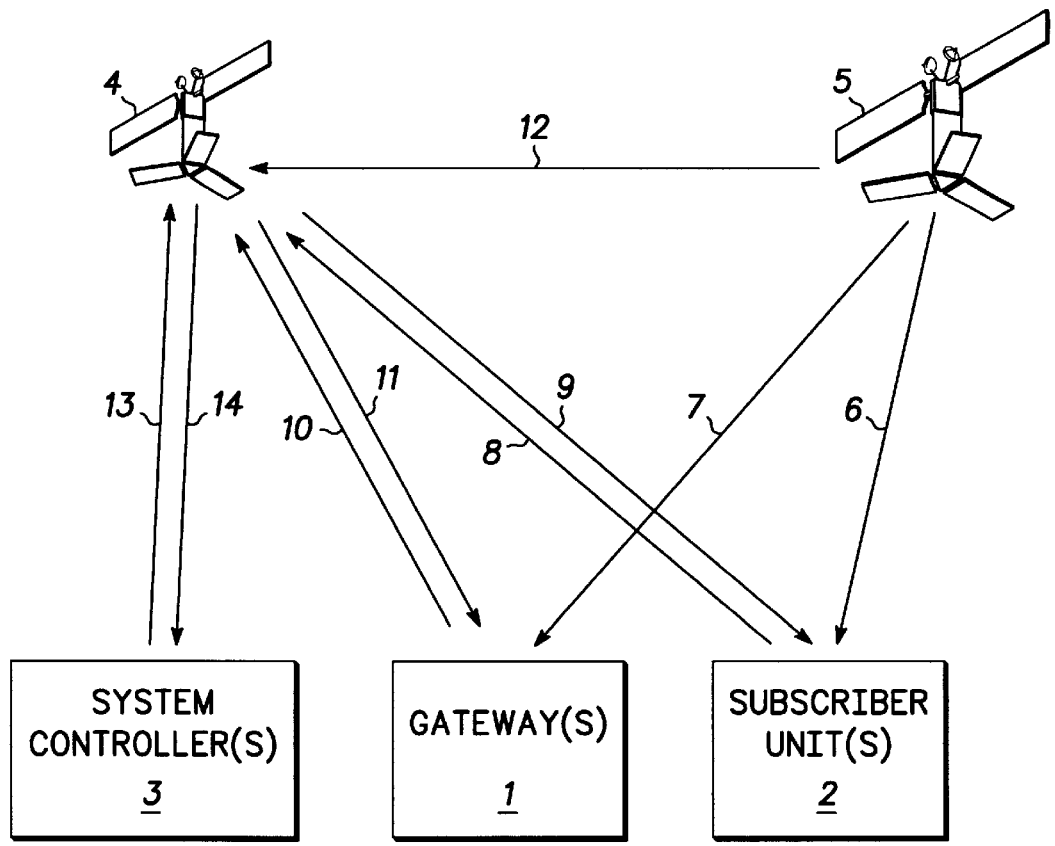
FIG. 1 shows a block diagram of a telecommunication system in accordance with a preferred embodiment of the present invention.

FIG. 1 shows a block diagram of telecommunication system 15 in accordance with a preferred embodiment of the present invention. System 15 includes communication satellites 4 and global positioning satellites 5 which orbit the earth and at least one system controller 3, at least one gateway 1, and subscriber units 2 which are on or proximate to the surface of the earth. Global positioning system satellites 5 (FIG. 1) can be the same or different from communication satellites 4 (FIG. 1).

Communication satellites 4 are part of a global communication system. Communication satellites 4 are in data communication with one another through data communication links that are not shown. In addition, communication satellites 4 receive signals on link 12 from global positioning system satellites 5. Communications, data and control signals can be routed on uplinks 13 and downlinks 14 by system controller 3 to communication satellites 4. Satellites 4 and gateways 1 serve as nodes for a global communication system (not shown) in telecommunication system 15. In a preferred embodiment, gateways 1 are located at fixed points on the surface of the earth. In addition, gateways 1 couple to a public switched telecommunication network (PSTN) (not shown) and route communications to PSTN users.

Telecommunication system 15 provides communication and data services to many subscriber units 2 located anywhere proximate to the surface of the earth. Because telecommunication system 15 provides global telecommunication services to fixed and mobile subscriber units 2, telecommunication system 15 has past and current location data for all registered subscriber units 2 in a preferred embodiment. Location data are extremely valuable to a global telecommunication system 15. Knowledge of subscriber unit location allows telecommunication system 15 to most advantageously route communications through nodes of system 15.

Subscriber units 2 can be configured as conventional portable radio communication equipment. In a preferred embodiment of the present invention, telecommunication system 15 accommodates the movement of subscriber units 2. However, subscriber unit movement is not required. A global positioning data service operates satisfactorily with moving and non-moving subscriber units 2. Subscriber units 2 are configured to communicate with nearby satellites and to perform other functions which are discussed below.

Subscriber units 2 are able to establish uplink 8 and downlink 9 with at least one of communication satellites 4 in a global communication system and to establish link 6 to receive data from visible global positioning satellites 5. Subscriber units 2 can obtain coarse estimates of their locations from information supplied on downlink 9 from communication satellites 4. In a preferred embodiment, subscriber units 2 also store their own current and past location data. Subscriber units 2 can be registered in one geo-political jurisdiction but can operate in any one of a number of different geo-political jurisdictions. Subscriber units 2 can be equipped with at least one of the types of global positioning receivers (e.g., GPS or GLONASS) and are able to process global positioning data service data for the global positioning systems they were designed to operate with.

Gateways 1 are able to establish uplink 10 and downlink 11 with at least one of communication satellites 4. Gateways 1 and subscriber units 2 are linked through satellites of a global communication system (not shown). Gateways 1 are equipped with global positioning system receivers which can receive data on link 7 from at least one of global positioning satellites 5 in at least one of the global positioning systems as those satellites become visible. Gateways 1, as will be discussed in more detail below, store and transmit almanac and ephemeris data for satellites 5 in all global positioning systems.

Global Positioning System (GPS) is a constellation of satellites 5 which transmits navigation information via radio signals. Time and location can be calculated by receivers which are able to receive and process these radio signals. GLONASS was another GPS-like satellite system. Both systems use two modulated L-band signals. The modulated signals include pseudo-random noise codes and data.

For convenience of explanation and not intended to be limiting to the present invention, operation of telecommunication system 15 is described for a GPS system, but those skilled in the art will understand that other location systems can also be used.

Figure 2:
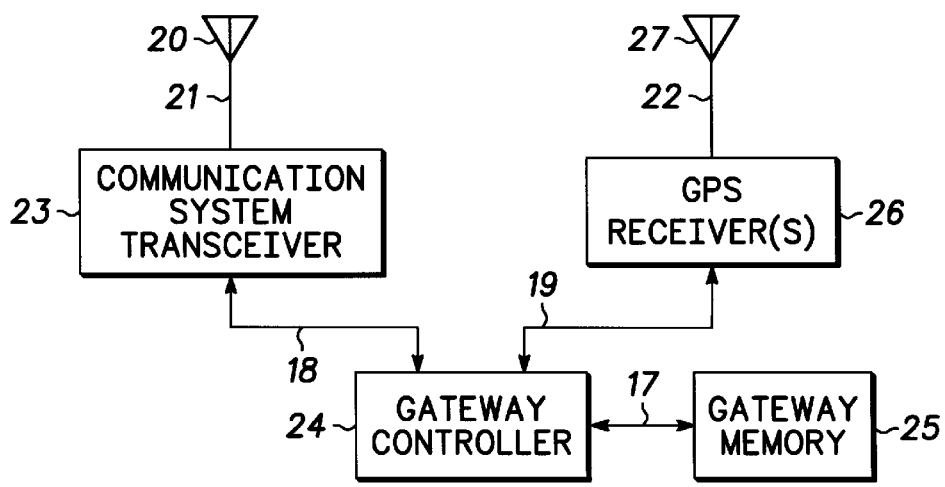
FIG. 2 shows a block diagram of a gateway which operates within a telecommunication system and provides a global positioning data service in accordance with a preferred embodiment of the present invention.

FIG. 2. shows a block diagram of gateway 1 (FIG. 1) which operates within telecommunication system 15 (FIG. 1) and provides a global positioning data service in accordance with a preferred embodiment of the present invention. Gateway 1 (FIG. 1) has been adapted to receive data from at least one global positioning satellite system. Antenna 27 receives downlink data from a global positioning system such as GPS and antenna 20 receives downlink data transmitted from satellites 4 (FIG. 1) of a global communication system. In addition, antenna 20 transmits on uplink 10 (FIG. 1) voice and digital data from gateway 1 (FIG. 1) to satellites 4 (FIG. 1) of a global communication system.

Antenna 20 is connected via link 21 to communication system transceiver 23 which serves to modulate and demodulate digital data which flows on link 18 to and from gateway controller 24. Antenna 27 is connected via link 22 to global positioning receiver 26. Global positioning receiver 26 can be one of several global positioning receivers operating in parallel to minimize opportunities for losing data. Global positioning receiver 26 sends and receives digital data via link 19 from gateway controller 24. Digital data sent to gateway controller 24 is obtained from global positioning satellites 5 (FIG. 1). Gateway controller 24 has the ability to store and retrieve digital data via link 17 from gateway memory 25. Gateway memory 25 can be any data storage mechanism. A portion of the digital data stored in gateway memory 25 is satellite ephemeris and almanac data for global positioning satellites 5 (FIG. 1). Another portion of the data stored is coarse and accurate location data for subscriber units 2 (FIG. 1) registered with this gateway 1 (FIG. 1). Both coarse and accurate location data are stored with time stamps indicating when the location data was last updated. This data is used during a global positioning data service.

Figure 3:
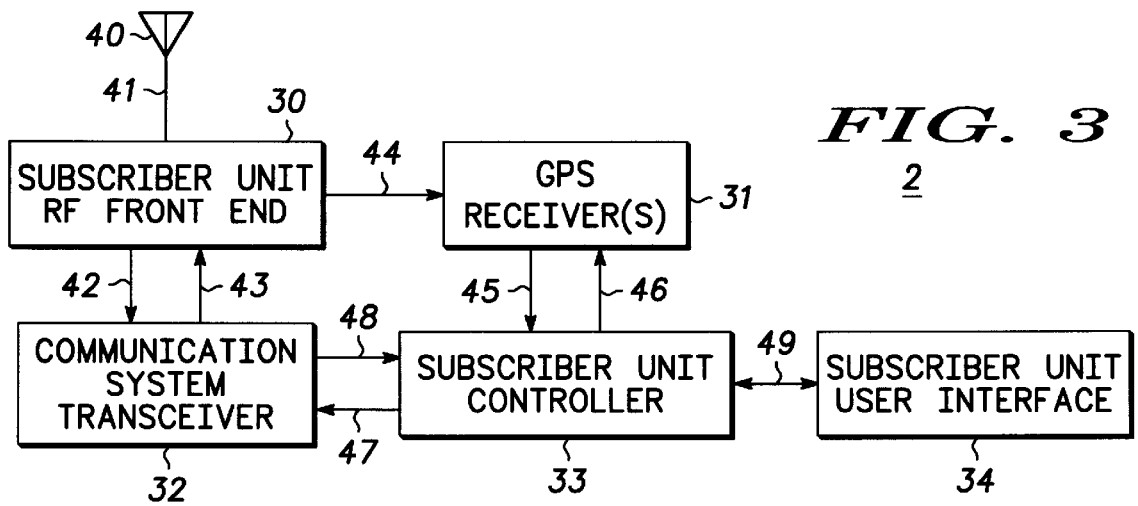
FIG. 3 shows a block diagram of a subscriber unit which communicates within a telecommunication system and uses a global positioning data service in accordance with a preferred embodiment of the present invention.

Gateway controller 24 determines if a subscriber unit 2 (FIG. 1) has access to this service. If subscriber unit 2 (FIG. 1) does not subscribe to this service, then gateway controller 24 sends an "access not available" message to subscriber unit 2 (FIG. 1). If subscriber unit 2 (FIG. 1) is a currently active subscriber to this service, then gateway controller 24 determines a best global positioning system constellation based on the subscriber unit's current location data. Gateway controller 24 uses coarse location data sent to it by subscriber unit 2 (FIG. 1) to compute a best set of global positioning system satellites. Gateway controller 24 sends this data via communication satellites 4 (FIG. 1) to subscriber unit 2 (FIG. 1) that requested the data. Controller 33 (FIG. 3) in subscriber unit 2 (FIG. 1) then uses this ephemeris data to aid in an acquisition process for a global positioning system receiver 31 (FIG. 3).

Gateway memory 25 contains memory devices for storing data that serve as instructions to gateway controller 24 and which, when executed by gateway controller 24, cause gateway controller 24 to carry out procedures which are discussed below. In addition, gateway memory 25 can contain memory devices for storage of data which can include variables, tables, and databases that are manipulated due to operation of gateway 1 (FIG. 1).

In a preferred embodiment, gateway 1 (FIG. 1) has primary and redundant global positioning system receivers 26 for constantly monitoring global positioning system satellites 5 (FIG. 1). Gateway 1 (FIG. 1) maintains an up-to-date catalog of all operational satellites in global positioning systems and their almanac and ephemeris data. Gateway 1 (FIG. 1) maintains a list of currently active subscribers to the global positioning data service.

Global positioning system receiver 26 determines ephemeris data for each of the GPS satellites. Gateway 1 (FIG. 1) stores in an associated memory 25 all ephemeris data for satellites 5 of the global positioning systems. Subscriber unit 2 (FIG. 1) sends its location to gateway 1 (FIG. 1). As a result, gateway controller 24 knows which satellites 5 (FIG. 1) are overhead at the subscriber unit's current location and sends that information to subscriber unit 2 (FIG. 1).

FIG. 3 shows a block diagram of subscriber unit 2 (FIG. 1) which communicates within telecommunication system 15 (FIG. 1) using satellites 5 (FIG. 1) of the global communication system and uses the global positioning data service in accordance with a preferred embodiment of the present invention. Referring to FIG. 3, antenna 40 receives downlink data from a global positioning system such as GPS as well as downlink data transmitted from satellites 4 (FIG. 1) of a global communication system. In addition, antenna 40 transmits, on an uplink, voice and digital data from subscriber unit 2 to satellites 4 (FIG. 1) of the global communication system.

Antenna 40 is connected via link 41 to subscriber unit radio frequency (R.F.) front-end 30. Since global positioning system information as well as transmissions from global communication system satellites 4 (FIG. 1) are in the same frequency band, they must be separated for processing. R.F. front-end 30 provides for the decombination of downlink signals into global positioning system signals which are carried on line 44 and global communication system received signals which are carried on line 42. R.F. front-end 30 also provides for the isolation of incoming downlink signals and outgoing uplink signals on link 41.

R.F. front-end 30 is connected via links 42, 43 to communication system transceiver 32. Links 42, 43 are provided for communication system transmitted signals 43 and communication system received signals 42. Transceiver 32 transmits and receives signals in a format compatible with communication satellites 4 in the global communication system. These signals include data messages which allow subscriber unit 2 to be in data communication with a nearby communication satellite 4 (FIG. 1). Through this satellite 4, subscriber unit 2 is also in data communication with any other node of the global communication system, such as a nearby gateway 1 (FIG. 1).

R.F. front-end 30 is also connected via link 44 to a global positioning system receiver 31. R.F. front end 30 ensures that global positioning system receiver 31 receives on link 44 only information from a global positioning system. Subscriber unit 2 receives signals broadcast by global positioning system and generates data describing a current location of the subscriber unit.

Communication system transceiver 32 serves to demodulate downlink data from a downlink carrier signal and modulate uplink data onto an uplink carrier signal. Demodulated data is sent via link 48 to subscriber unit controller 33. Modulation data is sent via link 47 from controller 33 to transceiver 32.

Communication system transceiver 32 and global positioning system receiver 31 both couple via links 45–48 to subscriber unit controller 33. Controller 33 additionally couples via link 49 to subscriber unit user interface 34. Also in a preferred embodiment, user interface 34 is used to collect user inputs, such as the operation of power switches, and the collection of phone numbers for placing a call. User interface 34 is also used to display messages included in the global positioning data service process to the user.

Controller 33, in a preferred embodiment, has access to timing and memory devices. Controller 33 maintains a record of current date and time. A memory portion of controller 33 includes an ability to store data which serve as instructions to controller 33 and which, when executed by controller 33, cause subscriber unit 2 to carry out procedures which are discussed in text and flow charts below. In addition, a memory portion includes variables, tables, and databases that are manipulated due to the operation of subscriber unit 2.

Controller 33 also maintains records of the subscriber unit's current location and update time, and records of coarse and accurate location data. Coarse location data is computed by controller 33 using information in signals broadcast by communication satellites 4 (FIG. 1) in the global communication system. Accurate location data is computed by controller 33 using information in signals broadcast by satellites 5 (FIG. 1) in a global positioning system.

Controller 33 maintains a record of the satellites the global positioning receiver used to compute accurate location data. As will be discussed in more detail below, subscriber unit 2 determines its own coarse and accurate location data. In a preferred embodiment of the present invention, subscriber unit 2 utilizes a global positioning system, such as GPS, to determine accurate location data. Subscriber units 2 utilize conventional techniques to monitor and process signals transmitted by communication satellites 4 (FIG. 1) to self-determine coarse location data.

Figure 4:
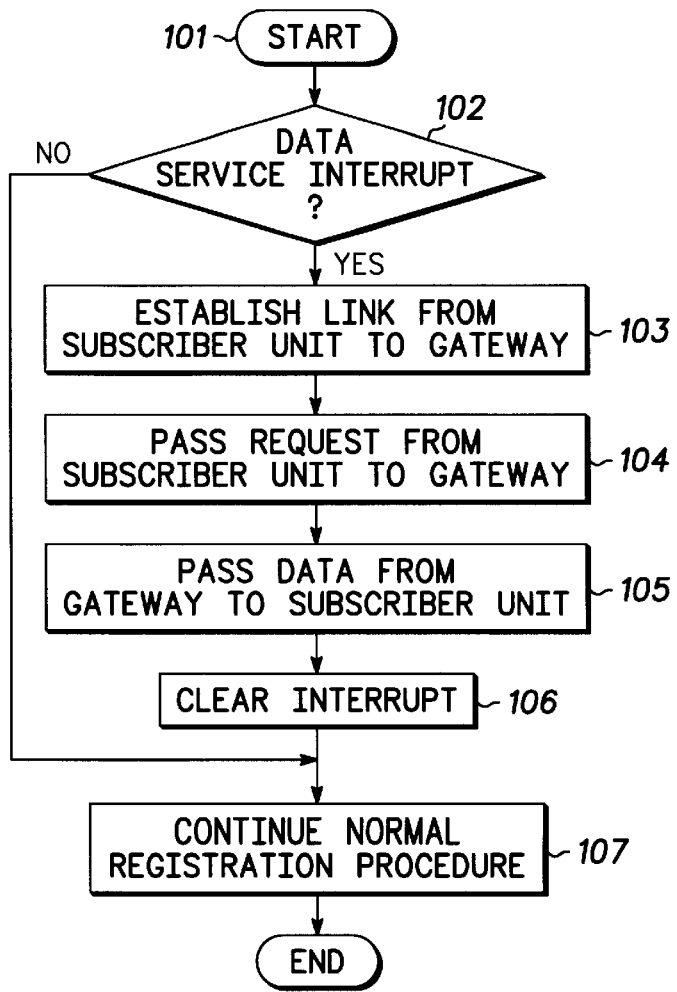
FIG. 4 shows a flow chart for a portion of a global positioning data service procedure desirably performed by a system controller in accordance with a preferred embodiment of the present invention.

FIG. 4 shows a flow chart for a portion of a global positioning data service procedure desirably performed by a system controller in accordance with a preferred embodiment of the present invention. System controller process 100 starts in step 101 by interrupting the normal registration procedure. In step 102, a global positioning data service query is perform in by the system controller. If the data service interrupt is not present, then the normal registration procedure continues. If the data service interrupt is present, then a link is established in step 103 between subscriber unit 2 (FIG. 1) and gateway 1 (FIG. 1) with which subscriber unit 2 is registered. In step 104, the request is passed from subscriber unit 2 to gateway 1. In step 105, the data is passed from gateway 1 (FIG. 1) to subscriber unit 2 (FIG. 1). In step 106, system controller 3 (FIG. 1) clears the global positioning data service interrupt after receiving a message from subscriber unit 2 (FIG. 1). After continuing normal registration in step 107, process 100 ends.

Figure 5:
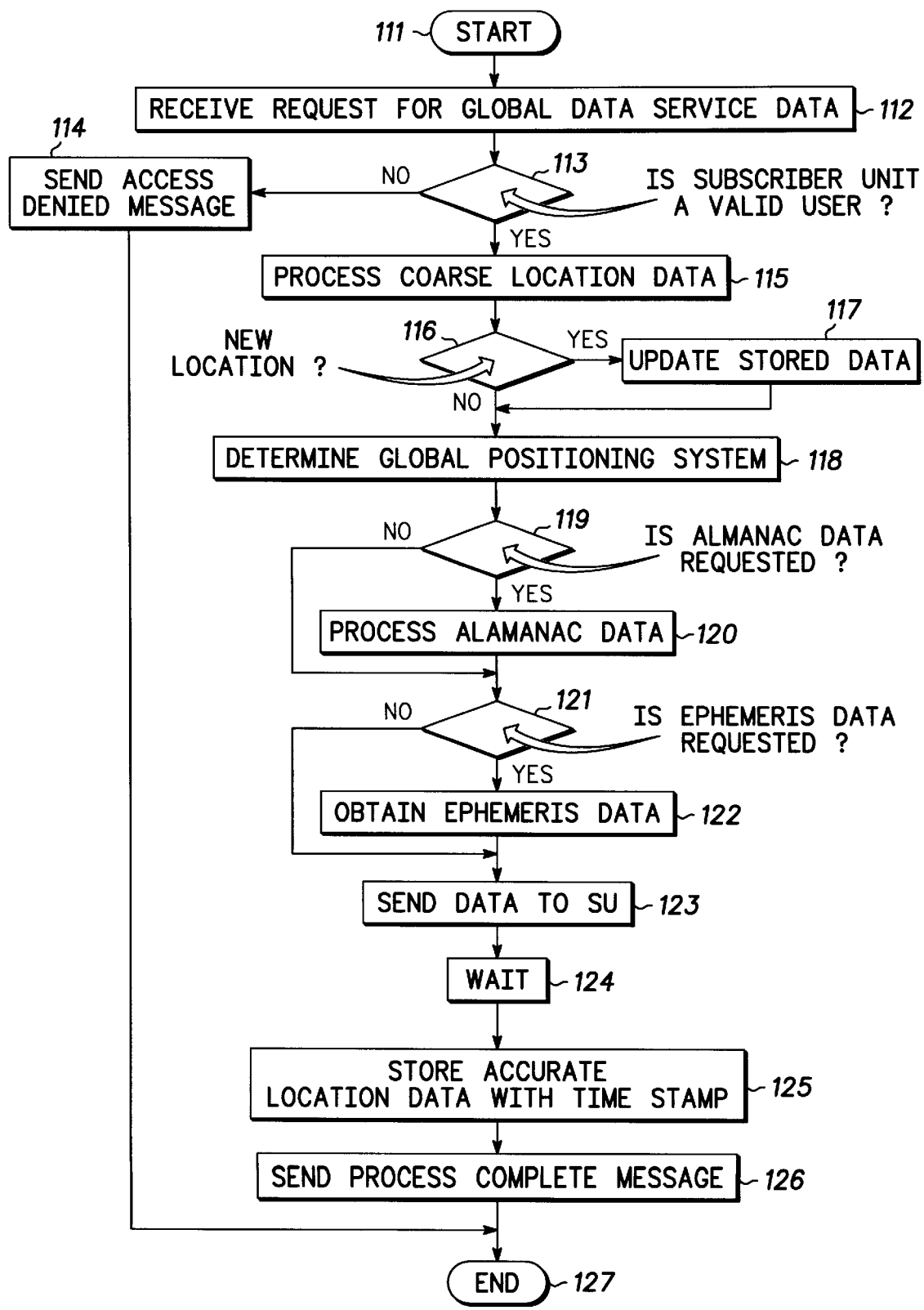
FIG. 5 shows a flow chart for a portion of a global positioning data service procedure desirably performed by a gateway in accordance with a preferred embodiment of the present invention.

FIG. 5 shows a flow chart for a portion of a global positioning data service procedure desirably performed by gateway 1 in accordance with a preferred embodiment of the present invention. Step 111 starts process 110. In step 112, a request for global positioning data service data is received. A query is performed in step 113 to determine if the requester is a valid subscriber to the data service. If subscriber unit 2 (FIG. 1) is not a valid user, gateway controller 24 sends an access denial message in step 114 to the user and ends process 110. If subscriber unit 2 (FIG. 1) is a valid user, gateway controller 24 processes coarse location data in step 115 and performs a comparison between received (current) coarse location data and stored (previous) coarse location data in step 116. If location data indicates that subscriber unit 2 is in a new location, gateway controller 24 updates, in step 117, its stored coarse location data for this subscriber unit 2 (FIG. 1). In step 118, gateway controller 24 determines which of the global positioning satellite systems the requesting unit belongs.

Process 110 continues with step 119. In step 119, gateway controller 24 determines if almanac data was requested. If almanac data is requested, gateway controller uses step 120 to obtain almanac data for only certain global positioning satellites. As a part of step 120, received coarse location data and knowledge of the subscriber unit's global positioning system is used by gateway controller 24 to compute which global positioning satellites form a best constellation for subscriber unit 2 (FIG. 1) at its current location. If almanac data was not requested, gateway controller 24 skips step 120 and proceeds to step 121. If almanac data was requested, then almanac data for the certain satellites in a best constellation is included as part of the global positioning data service data and process 110 continues with step 121.

In step 121, gateway controller 24 determines if ephemeris data is requested. If ephemeris data is requested, gateway controller uses step 122 to obtain ephemeris data for only certain global positioning satellites. As a part of step 122, received coarse location data and knowledge of the subscriber unit's global positioning system is used by gateway controller 24 to compute which global positioning satellites form a best constellation for subscriber unit 2 (FIG. 1) at its current location. If ephemeris data was not requested, gateway controller 24 skips step 122 and proceeds to step 123. If ephemeris data was requested, then ephemeris data for the certain satellites in a best constellation is included as part of the global positioning data service data and process 110 continues with step 123.

In step 123, gateway controller 24 sends global positioning data service data to subscriber unit 2. Step 124 follows in which gateway controller 24 waits for accurate location data to be received from subscriber unit 2. In step 125, accurate location data is stored in a table with a time stamp in gateway memory 25. In step 126, a message is sent to inform subscriber unit 2 (FIG. 1) that global positioning data service process is complete. Process 110 ends with step 127 in which system controller 3 (FIG. 1) is notified to clear the global positioning data service interrupt.

Gateways 1 (FIG. 1) desirably perform a location tracking function for telecommunication system 15 (FIG. 1), but a tracking function can be performed elsewhere in telecommunication system 15 (FIG. 1) in alternate embodiments. Each gateway 1 (FIG. 1) performs this function for those subscriber units 2 (FIG. 1) which are registered with that gateway 1. In a preferred embodiment, each subscriber unit 2 (FIG. 1) has a home gateway 1 (FIG. 1), but can be roaming within an area served by any other gateway 1 (FIG. 1). From the perspective of a gateway 1 (FIG. 1), a global positioning data service request can be received from any registered subscriber unit 2 (FIG. 1) at any time.

As explained in conjunction with FIG. 5, task 125 stores accurate location data in gateway's subscriber unit database. The database includes a record for each registered subscriber unit 2 (FIG. 1). Each record includes a data field for subscriber unit's ID, a data field for subscriber unit's coarse location, a data field for subscriber unit's accurate location, and data fields for time data associated with location data.

Figure 6:
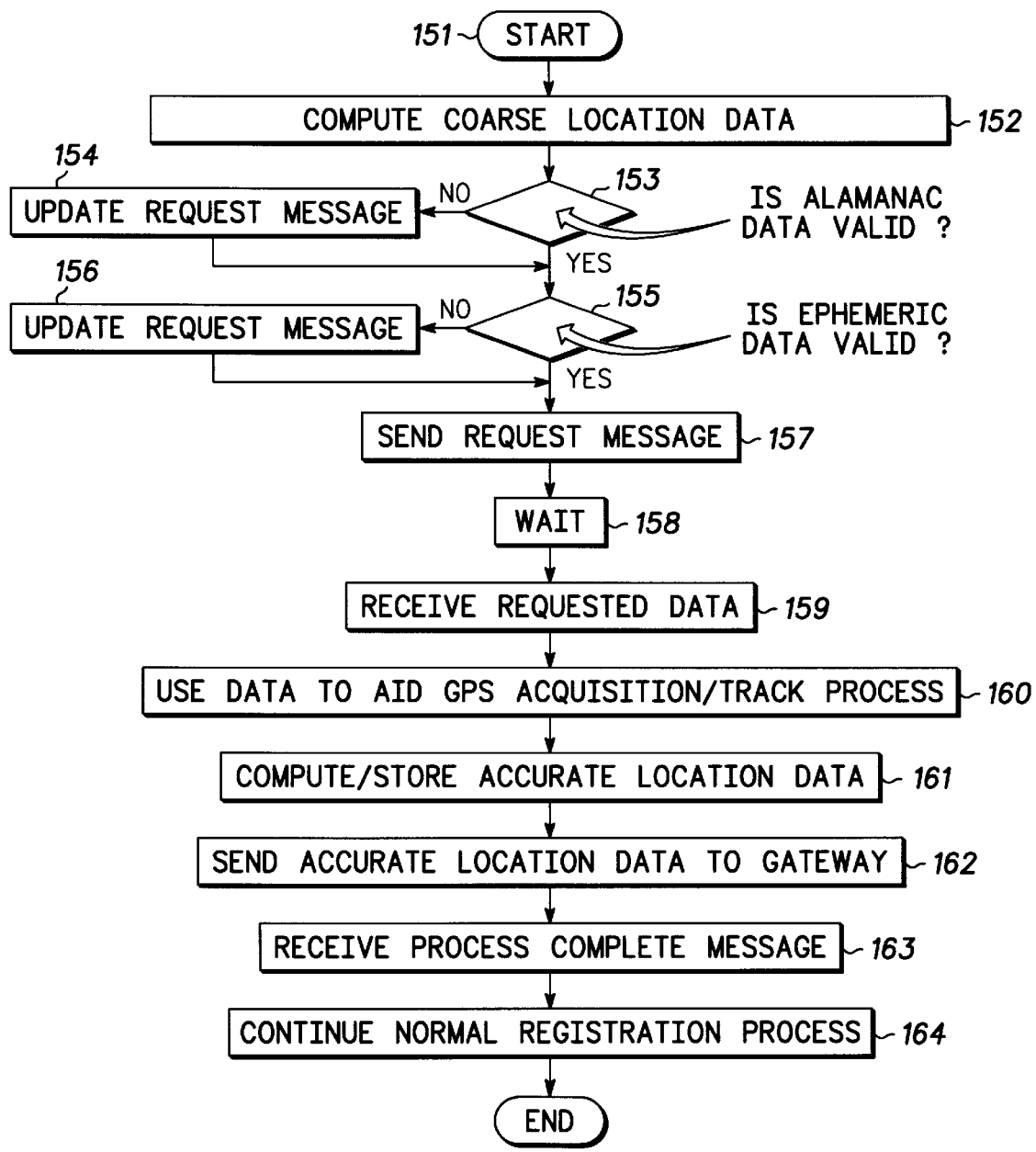
FIG. 6 shows a flow chart for a portion of a global positioning data service procedure desirably performed by a subscriber unit in accordance with a preferred embodiment of the present invention.

FIG. 6 shows a flow chart for a portion of a global positioning data service procedure desirably performed by subscriber unit 2 (FIG. 1) in accordance with a preferred embodiment of the present invention. Process 150 is a preferred embodiment of an accurate location determining process. Start 151 is performed whenever a subscriber unit 2 (FIG. 1) is energized or re-registration takes place. Those skilled in the art will appreciate that, during energizing and re-registration, numerous memory locations can be set to predetermined values. In step 152, coarse location data is computed using beam centering information provided by a broadcast channel from one of communication satellites 4 (FIG. 1). A location table within subscriber unit 2 (FIG. 1) is used to store this coarse location data with a time stamp.

In a preferred embodiment, subscriber units 2 (FIG. 1) repetitively perform location update procedures on a regular schedule while operating in either standby mode or in a call mode. During a location update procedure, subscriber units 2 (FIG. 1) can determine a need to re-register due to a passage of time or a change in location. This regular schedule can vary from once every few seconds to once every several minutes or hours.

After coarse location data has been determined in step 152, subscriber unit 2 (FIG. 1) determines in step 153 if it has valid global positioning system almanac data. One criteria for determining the validity of stored data is its age. A second criteria is location data. In this validity test, subscriber unit 2 (FIG. 1) determines if its current location is within a specified area with respect to its last stored location.

If subscriber unit 2 (FIG. 1) determines GPS almanac data is not valid, it updates a global positioning data service request in step 154 and continues with step 155. If the almanac data is valid, subscriber unit 2 proceeds to step 155.

In step 155, subscriber unit 2 (FIG. 1) determines if it has valid GPS ephemeris data. If subscriber unit 2 (FIG. 1) determines GPS ephemeris data is not valid, it updates a global positioning data service request in step 156 and continues with step 157. If the ephemeris data is valid, subscriber unit 2 proceeds to step 157.

In step 157, a global positioning data service request and coarse location data is sent via communication satellites 4 (FIG. 1) to controlling gateway 1 (FIG. 1) for requesting subscriber unit 2 (FIG. 1). In step 158, accurate location process 150 in subscriber unit 2 (FIG. 1) waits for requested data to be received from gateway 1 (FIG. 1). In step 159, requested data is received and processed so that it can be used by GPS receiver 31 (FIG. 3). GPS receiver 31 (FIG. 3) uses the global positioning data service data in step 160 to enhance acquisition and tracking of required satellites 5 (FIG. 1) in a global positioning system.

Accurate location process 150 continues with step 161 in which accurate location data is computed and stored. In step 162, accurate location data is sent by subscriber unit 2 (FIG. 1) to gateway 1 (FIG. 1). Subscriber unit 2 (FIG. 1) receives, in step 163, a process complete message from gateway 1 (FIG. 1) indicating the status of the accurate location process. Subscriber unit 2 then continues, in step 164, with a normal registration process and process 150 ends. After registration, subscriber unit 2 (FIG. 1) is ready to send or receive calls.

When subscriber unit 2 (FIG. 1) is waiting for either an incoming call or for user input instructing an outgoing call, it operates in a standby mode. From standby mode it can enter and return from a call processing mode when another telecommunication system user calls. When subscriber unit 2 (FIG. 1) is off (powered down), it enters a battery saving power down state.

Subscriber units 2 (FIG. 1) determine their current locations on a regular schedule. When their current locations are outside of a particular threshold value with respect to their past location, they send location data messages to telecommunication system 15 (FIG. 1) updating location data being maintained by gateway 1 (FIG. 1) and to receive a definition of a new threshold value.

If this predetermined threshold has not been exceeded, then subscriber unit 2 (FIG. 1) compares a time stamp recorded with location data with the current date and time to determine if a predetermined duration has expired. Preferably, this duration is set to a very large value, such as once a month, so that relatively stationary subscriber units 2 (FIG. 1) do not consume a significant amount of battery power or communication resources in reporting their locations to telecommunication system 15 (FIG. 1).

While procedure 150 is preferably done during power-on or re-registration, a subscriber unit 2 (FIG. 1) can receive a message to update accurate location data from telecommunication system 15 (FIG. 1) at any time. An update message instructs subscriber unit 2 (FIG. 1) to respond by sending accurate location data describing its current location. In this update message, gateway 1 (FIG. 1) can include almanac and ephemeris data for subscriber unit 2 (FIG. 1). When an update message is received, some or all of tasks 152–164 can be performed.

The previously described subscriber unit with global communication system provided global positioning data service data provides the following advantages. First, a global communication system, by more quickly knowing a subscriber unit's fine location, will be able to provide better service to that subscriber unit especially in a congested area.

Second, in an emergency situation, a subscriber unit can be fine located in a shorter amount of time. This will aid responding personnel by pin-pointing an exact location for the emergency.

The present invention has been described above with reference to a preferred embodiment. However, those skilled in the art will recognize that changes and modifications can be made in this preferred embodiment without departing from the scope of the present invention. For example, while a preferred embodiment has been described in terms of using a GPS satellite based positioning system for providing location signals to subscriber units, other positioning systems or methods can also be employed. Accordingly, these and other changes and modifications which are obvious to those skilled in the art are intended to be included within the scope of the present invention.

What is claimed is:

1. In a global telecommunication system comprising a plurality of global positioning satellites, a plurality of communication satellites interconnected through data communication links into a global communication system, a plurality of subscriber units located proximate to a surface of an earth, and at least one gateway, a method for providing a global positioning data service to said plurality of subscriber units from said at least one gateway via said plurality of communication satellites, the method comprising the steps of:

a) a gateway of said at least one gateway, said gateway being coupled to said global communication system and to said plurality of global positioning satellites, receiving location information from said plurality of global positioning satellites, computing and storing almanac and ephemeris data for said plurality of global positioning satellites;

b) a subscriber unit of said plurality of subscriber units, said subscriber unit being coupled to said plurality of communication satellites, wherein said subscriber unit obtains coarse location data from at least one of said plurality of communication satellites and to said plurality of global positioning satellites, transmitting a request for said global positioning data service to said gateway via said plurality of communication satellites, said request comprising said coarse location data of said subscriber unit;

c) said gateway determining a constellation of global positioning satellites from said plurality of global positioning satellites using said coarse location data and providing almanac and ephemeris data for said constellation to said subscriber unit as global positioning data service data if said subscriber unit is a valid requester;

d) said subscriber unit using said global positioning data service data to self-determine accurate location data for said subscriber unit using said constellation of global positioning satellites; and e) said subscriber unit storing said global positioning data service data and said accurate location data.

2. The method, as claimed in claim 1, additionally comprising the step of:

said subscriber unit transmitting said accurate location data to said gateway using at least one communication satellite in said plurality of communication satellites.

3. In a telecommunication system comprising a plurality of global positioning satellites, a plurality of communication satellites interconnected through data communication links, at least one gateway, and a plurality of subscriber units located anywhere proximate to a surface of an earth, a method of operating a gateway which is coupled to said plurality of communication satellites and to said plurality of global positioning satellites to provide global positioning data service data to a subscriber unit which is coupled to said plurality of communication satellites and to said plurality of global positioning satellites, said method comprising the steps of:

a) receiving location information from said plurality of global positioning satellites;

b) decoding ephemeris and almanac data for said plurality of global positioning satellites from said location information;

c) storing said ephemeris and almanac data for said plurality of global positioning satellites;

d) receiving a request for said global positioning data service data from said subscriber unit, said request comprising coarse location data for said subscriber unit, wherein said subscriber unit determines said coarse location data from at least one of said plurality of communication satellites;

e) determining a constellation of global positioning satellites from said plurality of global positioning satellites using said coarse location data obtained from said request, determining almanac and ephemeris data for said constellation; and f) transmitting via said plurality of communication satellites said almanac and ephemeris data for said constellation as said global positioning data service data to said subscriber unit.

4. The method as claimed in claim 3 additionally comprising the steps of:

g) receiving accurate location data from said subscriber unit; and h) storing location data for said subscriber unit.

5. The method as claimed in claim 3 wherein step a) further comprises the step of:

a1) tracking a first number of satellites of said plurality of global positioning satellites as said first number of satellites are visible to said gateway.

6. The method as claimed in claim 3 wherein step b) further comprises the step of:

b1) determining current ephemeris and almanac data for all satellites of said plurality of global positioning satellites.

7. The method as claimed in claim 3 wherein step c) further comprises the step of:

c1) storing current ephemeris and almanac data for all satellites of said plurality of global positioning satellites.

8. In a telecommunication system comprising a plurality of global positioning satellites, a plurality of communication satellites interconnected through data communication links, at least one gateway coupled to said plurality of communication satellites and to said plurality of global positioning satellites, and at least one subscriber unit, coupled to said plurality of communication satellites and to said plurality of global positioning satellites, located anywhere proximate to a surface of an earth, a method of operating said at least one subscriber unit comprising the steps of:

a) determining coarse location data from at least one of said plurality of communication satellites;

b) sending to said at least one gateway via said plurality of communication satellites a request for global positioning data service data, wherein said request comprises said coarse location data;

c) receiving said global positioning data service data from one of said at least one gateway via said plurality of communication satellites, wherein said global positioning data service data comprises ephemeris and almanac data for a constellation of global positioning satellites which said at least one gateway has determined using said coarse location data;

d) processing said global positioning data service data;

e) using said ephemeris and almanac data for said constellation of global positioning satellites to self-determine accurate location data for said at least one subscriber unit; and f) sending said accurate location data to said at least one gateway.

9. The method as claimed in claim 8 wherein step a further comprises the steps of:

a1) determining when accurate location data is not valid;

a2) determining when stored global positioning satellite almanac data is not valid; and a3) determining when stored global positioning satellite ephemeris data is not valid.

10. A telecommunication system comprising:

a plurality of global positioning satellites;

a plurality of communication satellites interconnected through data communication links;

at least one gateway comprising means for establishing communication links with at least one of said plurality of global positioning satellites, means for establishing communication links with at least one of said plurality of communication satellites, means for receiving a request for global positioning data service data from a subscriber unit, means for receiving coarse location data for said subscriber unit from said request, means for determining a constellation of global positioning satellites from said plurality of global positioning satellites using said coarse location data; means for determining almanac and ephemeris data for said constellation, and means for transmitting via said plurality of communication satellites said almanac and ephemeris data for said constellation as said global positioning data service data to said subscriber unit; and at least one subscriber unit comprising means for establishing communication links with at least one of said plurality of global positioning satellites, means for establishing communication links with at least one of said plurality of communication satellites, means for determining coarse location data for said at least one subscriber unit from at least one of said plurality of communication satellites, means for sending a request for global positioning data service data to a gateway, said request comprising said coarse location data, means for receiving via said plurality of communication satellites said almanac and ephemeris data for said constellation as said global positioning data and means for using said almanac and ephemeris data for said constellation to determine accurate location information to decrease battery drain in said at least one subscriber unit.

11. The telecommunication system as claimed in claim 10, wherein each of said at least one gateway comprises:

means for storing said global positioning data service data.

12. A telecommunication system as claimed in claim 10 wherein said at least one subscriber unit comprises:

means for storing said global positioning data service data.

13. In a telecommunication system comprising a plurality of global positioning satellites, a plurality of communication satellites interconnected through data communication links, a plurality of subscriber units coupled to said plurality of communication satellites and to said plurality of global positioning satellites, wherein said plurality of subscriber units can be located anywhere proximate to a surface of an earth, and at least one gateway coupled to said plurality of communication satellites and to said plurality of global positioning satellites, a method for providing a global positioning data service to said plurality of subscriber units from said at least one gateway, said method comprising the steps of:

a) a gateway of said at least one gateway processing location information received from said plurality of global positioning satellites to determine ephemeris and almanac data for said plurality of global positioning satellites;

b) a subscriber unit of said plurality of subscriber units self-determining coarse location data for said subscriber unit using information received from at least one of said plurality of communication satellites;

c) said subscriber unit transmitting a request for said global positioning data service to said gateway via said plurality of communication satellites, wherein said request includes said coarse location data and a request for certain portions of said ephemeris and almanac data for said plurality of global positioning satellites;

d) said gateway using said coarse location data and said request for certain portions of said ephemeris and almanac data to determine which portions of said ephemeris and almanac data to send as global positioning data service data to said subscriber unit;

e) said gateway providing said global positioning data service data to said subscriber unit if said subscriber unit is a valid requester;

f) said subscriber unit using said global positioning data service data to self-determine accurate location data for said subscriber unit using said plurality of global positioning satellites; and g) said subscriber unit storing said global positioning data service data and said accurate location data.

14. The method, as claimed in claim 13, additionally comprising the step of:

said subscriber unit transmitting said accurate location data to said gateway using said plurality of communication satellites.

* * * * *